(12) United States Patent
Kim et al.

(10) Patent No.: US 9,729,550 B2
(45) Date of Patent: Aug. 8, 2017

(54) DEVICE AND METHOD FOR DETECTING BYPASS ACCESS AND ACCOUNT THEFT

(71) Applicant: Korea University Research and Business Foundation, Seoul (KR)

(72) Inventors: Huy Kang Kim, Seoul (KR); Dongnam Seo, Seoul (KR); Hwa Jae Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 449 days.

(21) Appl. No.: 14/347,913

(22) PCT Filed: Sep. 27, 2012

(86) PCT No.: PCT/KR2012/007780
§ 371 (c)(1),
(2) Date: Jun. 27, 2014

(87) PCT Pub. No.: WO2013/048125
PCT Pub. Date: Apr. 4, 2013

(65) Prior Publication Data
US 2015/0163224 A1    Jun. 11, 2015

(30) Foreign Application Priority Data

Sep. 30, 2011 (KR) .......... 10-2011-0099949
Sep. 30, 2011 (KR) .......... 10-2011-0099978

(51) Int. Cl.
*H04L 29/06* (2006.01)
*H04L 12/701* (2013.01)
(Continued)

(52) U.S. Cl.
CPC .............. *H04L 63/10* (2013.01); *A63F 13/73* (2014.09); *A63F 13/75* (2014.09); *H04L 45/00* (2013.01);
(Continued)

(58) Field of Classification Search
CPC . H04L 63/1466; H04L 45/00; H04L 63/0876; H04L 63/10; H04L 67/28;
(Continued)

(56) References Cited

U.S. PATENT DOCUMENTS

2006/0212572 A1* 9/2006 Afek .............. H04L 63/145
709/225
2009/0240874 A1* 9/2009 Pong .................. G06F 12/0223
711/105

FOREIGN PATENT DOCUMENTS

KR    1020060090920    8/2006
KR    1020090000824    1/2009
(Continued)

OTHER PUBLICATIONS

Machine translation of Foreign Patent Document Korean Patent Application Publication No. 10-2009-0000824.*
(Continued)

*Primary Examiner* — Kambiz Zand
*Assistant Examiner* — Benjamin Kaplan
(74) *Attorney, Agent, or Firm* — Duane Morris LLP; J. Rodman Steele, Jr.; Gregory M. Lefkowitz

(57) ABSTRACT

Disclosed is technology relating to a device and method for detecting bypass access and account theft. In the method for detecting bypass access from a client to a server according to the present invention: a server receives access data comprising data about hops on the route from the client to the server by using a route tracing agent; region data is extracted from the IP address(es) of the hop(s) comprised in the received access data; a judgment is made as to whether the extracted region data belongs to a pre-set access-permitted region; and the server detects whether the access from the client is bypass access, in accordance with the judgment results.

14 Claims, 11 Drawing Sheets

(51) Int. Cl.
   *H04L 29/08*       (2006.01)
   *H04W 12/12*       (2009.01)
   *A63F 13/73*       (2014.01)
   *A63F 13/75*       (2014.01)
   *A63F 13/35*       (2014.01)
   *A63F 13/71*       (2014.01)

(52) U.S. Cl.
   CPC .......... *H04L 63/0876* (2013.01); *H04L 63/14* (2013.01); *H04L 63/1425* (2013.01); *H04L 63/1441* (2013.01); *H04L 63/1466* (2013.01); *H04L 67/18* (2013.01); *H04L 67/28* (2013.01); *H04W 12/12* (2013.01); *A63F 13/35* (2014.09); *A63F 13/71* (2014.09); *H04L 63/107* (2013.01)

(58) Field of Classification Search
   CPC ..... H04L 67/18; H04L 63/14; H04L 63/1425; H04L 63/1441; H04L 63/107; A63F 13/73; A63F 13/75; A63F 13/35; A63F 13/71; H04W 12/12

USPC .......................................................... 726/27
   See application file for complete search history.

(56)          References Cited

FOREIGN PATENT DOCUMENTS

KR     1020090001603     1/2009
   KR     1020100041471     4/2010
   KR     1010058660000     12/2010
   KR     1020110060847     6/2011

OTHER PUBLICATIONS

Lee, Chul-won, et al., "A Study on Analysis and Control of Circumvent Connection to the Private Network of Corporation," Journal of the Korea Institute of Information Security and Cryptology, Jun. 20, 2010, vol. 20, Issue 6, pp. 183-194.

* cited by examiner

| Account | IP1 | IP2 | IP3 | IP4 | IP5 | CC1 | CC2 | CC3 | CC4 | CC5 | MAC |
|---|---|---|---|---|---|---|---|---|---|---|---|
| Cheng | 175.12.12.253 | 10.6.6.1 | 61.251.182.129 | 61.251.179.13 | 211.108.22.9 | CN | @P | KR | KR | KR | 00-30-18-A3-87-0F |
| Qorm2 | 175.12.12.253 | 10.6.6.1 | 61.251.182.129 | 61.251.179.13 | 211.108.22.9 | CN | @P | KR | KR | KR | 00-E0-4C-28-8B-0F |
| Jsk223 | 175.12.12.253 | 10.6.6.1 | 61.251.182.129 | 61.251.179.13 | 211.108.22.9 | CN | @P | KR | KR | KR | 00-25-11-EB-3A-B2 |
| Epfaks | 175.12.12.253 | 10.6.6.1 | 61.251.182.129 | 61.251.179.13 | 211.108.22.9 | CN | @P | KR | KR | KR | 00-E0-4C-28-8F-89 |
| Cient113 | 175.12.12.253 | 10.6.6.1 | 61.251.182.129 | 61.251.179.13 | 211.108.22.9 | CN | @P | KR | KR | KR | 00-E0-B0-F6-3D-7C |
| Wlwl221 | 175.12.12.253 | 10.6.6.1 | 61.251.182.129 | 61.251.179.13 | 211.108.22.9 | CN | @P | KR | KR | KR | 00-15-11-EB-40-F2 |
| Wlwl222 | 175.12.12.253 | 10.6.6.1 | 61.251.182.129 | 61.251.179.13 | 211.108.22.9 | CN | @P | KR | KR | KR | 00-15-11-EB-40-F2 |
| Xhwk00 | 175.12.12.253 | 10.6.6.1 | 61.251.182.129 | 61.251.179.13 | 211.108.22.9 | CN | @P | KR | KR | KR | 00-25-11-EB-3A-B2 |
| Ddckkk | 175.12.12.253 | 10.6.6.1 | 61.251.182.129 | 61.251.179.13 | 211.108.22.9 | CN | @P | KR | KR | KR | 00-0B-2F-2C-8A-DB |
| Rddkkk | 175.12.12.253 | 10.6.6.1 | 61.251.182.129 | 61.251.179.13 | 211.108.22.9 | CN | @P | KR | KR | KR | 00-30-18-AA-E7-78 |

| | MAX Similar path # | Total Records # | Similar path Rate | Distance |
|---|---|---|---|---|
| Cluster 1 | 71 | 274 | 25.9 | 1.7795342 |
| Cluster 2 | 47 | 189 | 24.9 | 1.9737878 |
| Cluster 3 | 115 | 300 | 38.3 | 2.0575467 |
| Cluster 4 | 38 | 378 | 10 | 2.2641369 |
| Cluster 5 | 51 | 363 | 14 | 2.2389803 |
| Cluster 6 | 64 | 248 | 25.9 | 1.8288191 |
| Cluster 7 | 16 | 35 | 45.7 | 1.2643813 |
| Cluster 8 | 97 | 305 | 31.8 | 2.0026599 |
| Cluster 9 | 1838 | 1838 | 100 | 0.7021869 |
| Cluster A | 306 | 433 | 70.7 | 0.9972926 |
| Cluster B | 280 | 290 | 96.6 | 0.8272281 |
| Cluster C | 56 | 347 | 16.1 | 2.2322931 |

700

DEVICE AND METHOD FOR DETECTING BYPASS ACCESS AND ACCOUNT THEFT

CROSS-REFERENCE TO RELATED APPLICATIONS

This application is a §371 national stage entry of International Application No. PCT/KR2012/007780, filed Sep. 27, 2012, which claims priority to South Korean Patent Application No. 10-2011-0099949, filed Sep. 30, 2011 and South Korean Patent Application No. 10-2011-0099978, filed Sep. 30, 2011, the entire contents of which are incorporated herein by reference.

TECHNICAL FIELD

The present invention relates to a technique for detecting bypass access. More particularly, the present invention relates to an apparatus and method for detecting a client that wants to access a server through a plurality of network routes, to hide its access route by the server, a recording medium that records the method, and a method for preventing account theft using log information about an on-line game, which can readily determine whether a user account has been stolen by analyzing log information generated while the user plays a game.

BACKGROUND ART

An on-line service provider that provides a service over the Internet prepares various operation policies and technical means to prevent access from a malicious user who is highly likely to attack or do monetary damage to the service and facilities of the on-line service provider, thereby guaranteeing stable provision of the service. In general, many on-line service providers impose restrictions on illegal behaviors by blocking the accounts or access Internet Protocol (IP) addresses of malicious users. Further, an on-line service provider may limit its service to a specific region or country in view of the nature of the service. Under this policy, the on-line service provider extracts country information from the IP address of an accessing user. If the country information indicates a non-service region, the on-line service provider may deny the service to the user.

However, the on-line service user may circumvent the blocking and service denial technology by manipulating the user's IP address and information about the access region using a proxy server or a Virtual Private Network (VPN), against the operation policy of the on-line service provider. Various techniques related to bypass access to a Private Network (PN) are disclosed in the following cited non-patent documents (Non-Patent Document 1: Chul-Won, LEE, Whi-Kang, KIM, and Jong-In I M, A Study on Analysis and Control of Circumvent Connection to the Private Network of Corporation, Journal of the Korea Institute of Information Security and Cryptology 20 (6) 183-194, 2020). If a user adopts the circumventing technology, an on-line service provider may not block the user, posing a risk that the provider's service is not normally provided.

Various on-line transactions have been increased as a result of rapid advances in Internet technology. Stability and security should be guaranteed for the service operation. Accordingly, there is a need to develop an effective technique for detecting an illegal bypass access attempt from an on-line service user who uses a circumventing technology such as a proxy server or a VPN while hiding its location and access region in a network, when an on-line service is provided in the network.

Along with the development of Information Technology (IT) and the increase of leisure time, there have been increasing demands for using leisure time by the IT technology. In this context, the on-line game industry has been rapidly boosted. Recently, on-line games in which a plurality of connected on-line users play roles simultaneously in the same space, have gained much popularity.

Such an on-line game basically supports a chatting system in which a plurality of game users can make conversations with each other and it builds a guild or a clan as a community system that establishes a social relationship between game users so that the game users can enjoy the game. Therefore, a plurality of game users may play different roles, fulfill their missions, or exchange or trade items and game money required for the game, during battles in the game.

However, a malicious user steals an authorized user's account and illegally transacts the game asset of the authorized user such as items or game money, causing monetary damage and mental stress to the authorized user.

The following prior art methods are known for the prevention of account theft using log information about on-line games.

Korea Patent Publication No. 2011-0060847 (Patent Document 1), which was filed on Jun. 8, 2011, relates to a method and system for monitoring and cutting off an illegal electronic commerce. According to Patent Document 1, an illegal electronic commerce that would be considered to be a normal transaction by conventional security technology is monitored/detected, among all electronic transaction services over the Internet.

Korea Patent Publication No. 2010-0027836 (Patent Document 2), which was filed on Mar. 11, 2010, relates to an advanced web log preprocess method and system for a rule based web IDS system. According to Patent Document 2, the attack detection performance of a web IDS system is increased by performing a pre-process to provide an efficient search function regarding web log information, and at the same time, to increase the efficiency of rule-based attack detection regarding a large amount of log information generated by a web server.

DISCLOSURE

Technical Problem

A first object of the present invention is to overcome limitations in blocking illegal users from altering their access Internet Protocol (IP) addresses using a circumventing means such as a proxy server or a Virtual Private Network (VPN), encountered when a conventional on-line service provider relies mainly on blocking of a user account and an IP address to prohibit a user's access, and further to solve a problem that a malicious user group attempts to circumvent a policy of the on-line service provider using a network circumventing means in the case where the on-line service provider limits an on-line service such as an on-line game service or a streaming service to a specific country or region.

A second object of the present invention is to provide a method for preventing account theft using log information about an on-line game, which prevents monetary damage to a user caused by account theft by analyzing unique user information and behavior information generated during playing an on-line game to determine whether the account of the user has been stolen.

Technical Solution

To achieve the first object, one embodiment of the present invention provides a method for detecting bypass access of a client to a server, including receiving access information including hop information about a route from the client to the server through a route tracing agent by the server, extracting region information from Internet Protocol (IP) addresses of hops included in the received access information by the server, determining whether the extracted region information is about a predetermined access-allowed region by the server, and determining whether access of the client is bypass access according to a result of the determination by the server.

The method may further include, if it is determined that the access of the client is bypass access, blocking the bypass access of the client by the server.

The hop information may include IP addresses of a predetermined number of hops selected in order of proximity to the client from among IP addresses of a plurality of hops included in the route from the client to the server. The route tracing agent may be installed in the client and may collect IP addresses of hops involved in the route from the client to the server and transmit the collected IP addresses of the hops to the server.

The extraction may include querying a database mapping IP address ranges to region information, using the IP addresses of the hops included in the received access information, and receiving region information matching to the query. The region information may include at least one of a country code or a city code.

A further embodiment of the present invention provides a method for detecting bypass access of a client to a server, including receiving access information including user identification information and hop information about a route from the client to the server through a route tracing agent by the server, extracting region information from IP addresses of hops included in the received access information by the server, generating a case vector defined by a plurality of feature parameters representing an access pattern of the client based on the received access information by the server, and detecting a malicious user group attempting bypass access based on the generated case vector by the server.

The method may further include, if the malicious user group is detected, blocking bypass access of the malicious user group by the server.

The hop information may include IP addresses of a predetermined number of hops selected in order of proximity to the client from among IP addresses of a plurality of hops included in the route from the client to the server. The route tracing agent may be installed in the client and may collect IP addresses of hops involved in the route from the client to the server and transmit the collected IP addresses of the hops to the server.

The detection of the malicious user group may include calculating distances between a plurality of case vectors generated for clients, taking into account similarities between the feature parameters of the case vectors, generating clusters in relation to accesses of the clients by calculating similarities from the case vectors using Multi-Dimensional Scaling (MDS), and determining a cluster having a similarity equal to or larger than a first threshold and a distance equal to or smaller than a second threshold to be a malicious user group.

Another embodiment of the present invention provides a computer-readable recording medium recording a program to implement the methods for detecting bypass access of a client to a server in a computer.

To achieve the second object, another embodiment of the present invention provides a method for preventing account theft using log information about an on-line game, including collecting at least one piece of log information generated while a user plays a game, acquiring, from the log information, at least one piece of unique user information for identifying a user terminal and at least one piece of behavior information indicating whether game asset of the user has been reduced, identifying the user by comparing the unique user information acquired from the log information with pre-stored reference unique user information about the user, determining whether the game asset has been reduced by analyzing the behavior information acquired from the log information, and determining that an account of the user has been stolen, if the user terminal is not identified and the game asset of the user has been reduced.

More preferably, the determination as to whether the game asset has been reduced by analyzing the behavior information includes determining whether an activity of reducing the game asset of the user has occurred for a predetermined time by analyzing the behavior information.

More preferably, the method further includes, if it is determined that the account of the user has been stolen, at least one of blocking the user terminal having corresponding IP address information as the unique user information from accessing a game server, outputting a warning sound indicating account theft to the user terminal, and re-authenticating the user using a public certificate or Internet-Personal Identity Number (I-PIN) information of the user so that the user terminal accesses the game server.

Particularly, the unique user information includes at least one of IP address information, Medium Access Control (MAC) address information, country information, or city information about the user terminal connected to the game server for a game play.

Particularly, the behavior information represents at least one activity of cash payment, item trading, or transfer of game money which reduces the game asset of the user, after the user terminal accesses the game server.

Advantageous Effects

According to the embodiments of the present invention, a server receives access information including hop information about a route from a client to the server through a route tracing agent installed in the client and analyzes the access information. Therefore, even though an unauthorized user attempts to access the server by a circumventing means such as a proxy server or a virtual private network, an actual access route of the unauthorized user can be perceived accurately. Thus, bypass access of the illegal user can be determined and blocked. In addition, a malicious user group is monitored by cluster analysis based on case vectors. Therefore, when an on-line service is limited to a specific country or region, a malicious user group attempting bypass access from the outside of the specific country or region can be monitored and blocked effectively.

In the method for preventing account theft using log information about an on-line game according to the present invention, it is determined whether the account of a user has been stolen by analyzing unique user information and behavior information indicating a behavior that reduces the game asset of the user, included in log information generated while the user plays a game. Therefore, monetary and metal damages that might be caused by account theft can be prevented.

In the method for preventing account theft using log information about an on-line game according to the present invention, user unique information included in log information generated during a game play of a user whose account has been stolen is stored and access of a user terminal having a corresponding IP address to a game server is blocked. Consequently, theft of the account of another user can be prevented.

In the method for preventing account theft using log information about an on-line game according to the present invention, since a warning sound is emitted to a user who has stolen an account, account theft can be announced to the user.

In the method for preventing account theft using log information about an on-line game according to the present invention, if theft of a user's account is detected by analyzing log information, the user is re-authenticated using a public certificate or I-PIN information. Thus, even though the account is stolen, activities of reducing the game asset of the user such as game item trading and cash payment can be effectively prevented.

In the method for preventing account theft using log information about an on-line game according to the present invention, if account theft is detected, unique user information included in log information generated during a game play of an account thief currently logging in to a game server is stored and listed separately so that the unique user information can be managed continuously.

BRIEF DESCRIPTION OF THE DRAWINGS

FIG. 6 lists exemplary log values of case vectors of clusters detected by a bypass access detection method according to embodiments of the present invention;

FIG. 7 lists exemplary a malicious user group detected from clusters generated by a bypass access detection method according to embodiments of the present invention;

BEST MODE FOR CARRYING OUT THE INVENTION

In one embodiment of the present invention, a method for detecting bypass access of a client to a server includes receiving access information including hop information about a route from the client to the server through a route tracing agent by the server, extracting region information from Internet Protocol (IP) addresses of hops included in the received access information by the server, determining whether the extracted region information is about a predetermined access-allowed region by the server, and determining whether access of the client is bypass access according to a result of the determination by the server.

In another embodiment of the present invention, a method for preventing account theft using log information about an on-line game includes collecting at least one piece of log information generated while a user plays a game, acquiring, from the log information, at least one piece of unique user information for identifying a user terminal and at least one piece of behavior information indicating whether game asset of the user has been reduced, identifying the user by comparing the unique user information acquired from the log information with pre-stored reference unique user information about the user, determining whether the game asset has been reduced by analyzing the behavior information acquired from the log information, and determining that an account of the user has been stolen, if the user terminal is not identified and the game asset of the user has been reduced.

MODE FOR CARRYING OUT THE INVENTION

Before describing embodiments of the present invention proposed to achieve the first object, the technical field of the embodiments of the present invention, that is, an environment where bypass access of a malicious user on a network is detected and a security measure is taken against the bypass access will be described in brief and the basic idea of the present invention that can be derived from the features of the environment will be presented.

Figure 1:
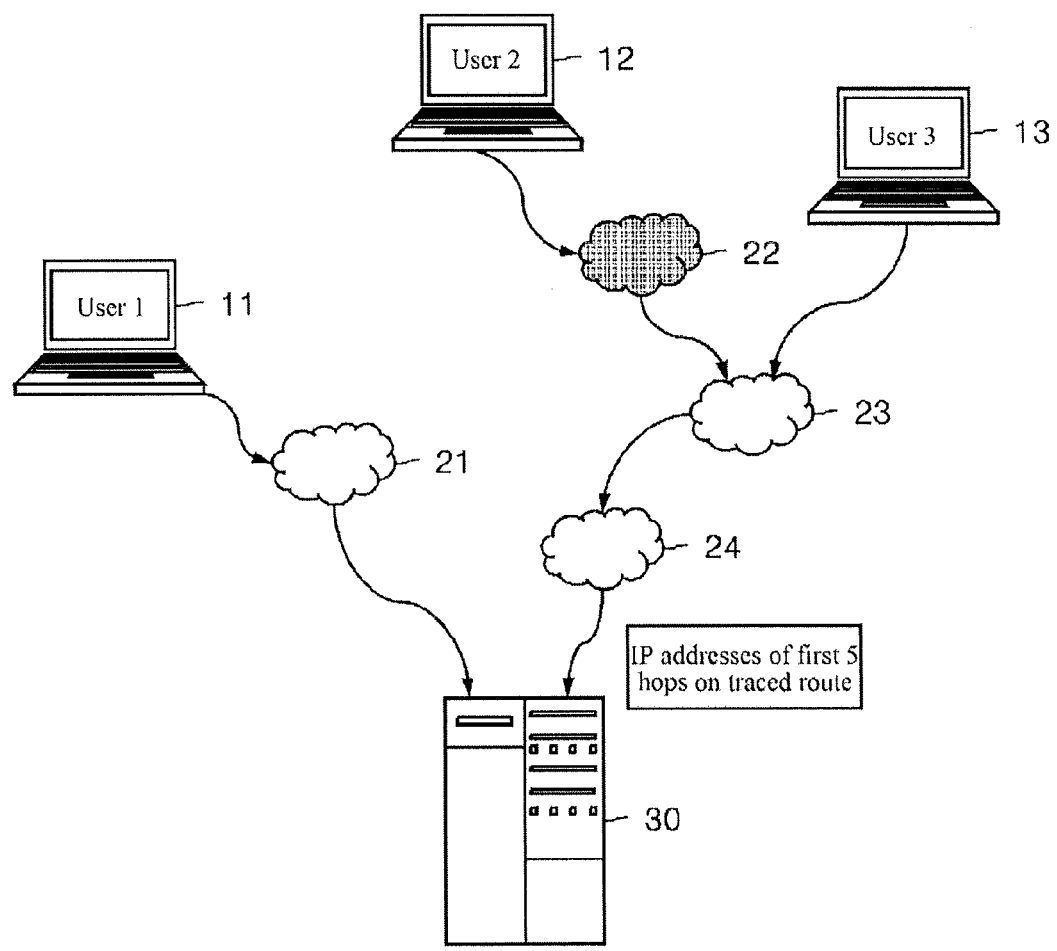
FIG. 1 illustrates a bypass access method and a basic idea for detecting bypass access in an environment where embodiments of the present invention are implemented.

FIG. 1 illustrates a bypass access method and a basic idea for detecting a bypass access in an environment where embodiments of the present invention are implemented. The illustrated system largely includes user terminals 11, 12, and 13 (any user devices connectable through a network, such as Personal Computers (PCs) and smartphones) and a server 30 that provides an on-line service in response to a request. The user terminals 11, 12, and 13 may access the server 30 through various networks 21, 22, 23, and 24.

Under such environments, it is assumed that the server 30 and the user terminal 11 (User 1) are geographically located in Korea, the user terminal 12 (User 2) is geographically located in China, and the user terminal 13 (User 3) is geographically located in Japan. It is also assumed that the on-line service provider 30 determines to allow access from User 1 and User 3 and to prohibit access from User 2 for security reasons. In this case, if User 2 attempts to access the server 30 through a plurality of proxy servers or virtual private networks while hiding its Internet Protocol (IP)

address, the server 30 needs a technical means to detect and block the bypass access of User 2.

For this purpose, embodiments of the present invention provide methods for detecting illegal access using route information collected by a special agent program installed in each of the user terminals 11, 12, and 13 and tracing a route for an access of a user by the special agent program. Particularly, the on-line service provider 30 may collect route tracing information about first 5 hops starting from the user terminals 11, 12, and 13 through the agent program and may extract and use country information or city information from IP addresses of the collected hops. Herein, the first 5 hops refer to 5 hops in order of proximity to the user terminals 11, 12, and 13 in a route from the starting point of a user access (i.e. the user terminal 11, 12, or 13) to the server 30. The reason for selecting first 5 hops is that the departure of an access is the most important information indicating the location of a user. Despite the same physical location, different network routes may be established in the case of long-distance packet transmission. Nonetheless, the locations of departures or hop information about the departures may be substantially the same or similar. That is, as a route for an access attempt is nearer to the user terminal 11, 12, or 13, the route may be regarded as more important information. The first 5 hops are merely exemplary, and thus the number of hops to be considered may be appropriately selected according to the intended need or depending on an implementation environment.

In the exemplary environment illustrated in FIG. 1, even though User 2 attempts to access the server 30 using a circumventing means such as a proxy server or a virtual private network, the server 30 may detect the bypass access attempt of User 2 based on hop information collected by the route tracing agent program. For example, the server 30 may determine whether User 2 is attempting bypass access by checking whether there is an IP address corresponding to a non-service region among the IP addresses of collected first 5 hops.

The on-line service provider 30 may prohibit access from China, while allowing access from Korea and Japan, according to its policy. In this case, access from China may be blocked by checking the addresses of proxy servers, virtual private networks, and routers located in China. If a plurality of illegal accesses are attempted through the specific router 22 located in China, the address of the router 22 may be detected and users routed through the router 22 may be regarded as a malicious user group and thus blocked. In this case, besides the IP addresses of the first 5 hops, additional information such as the MAC addresses, country information, city information, and account names of the users may be collected and subjected to cluster analysis.

Embodiments of the present invention will now be described in detail with reference to the accompanying drawings.

Figure 2:
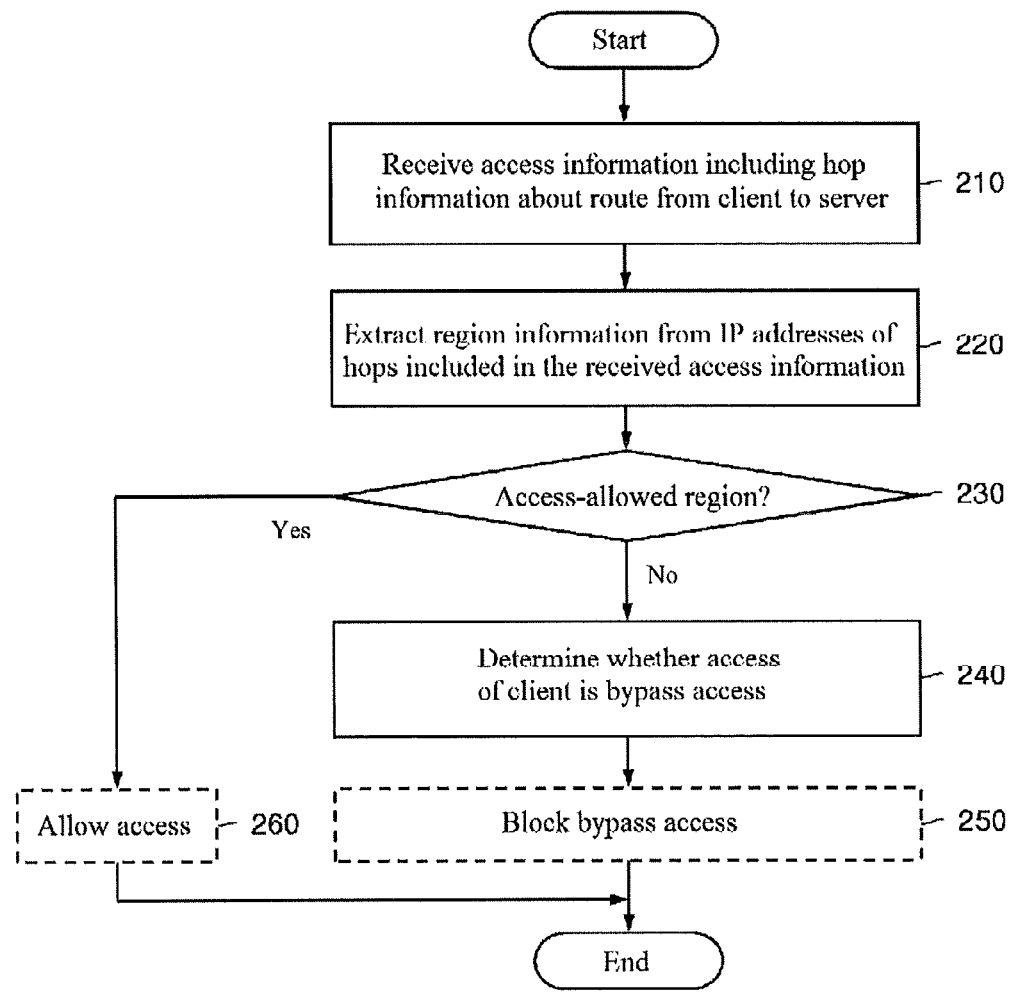
FIG. 2 is a flowchart illustrating a method for detecting bypass access of a client to a server according to one embodiment of the present invention.

FIG. 2 is a flowchart illustrating a method for detecting bypass access of a client to a server according to one embodiment of the present invention. The method includes the following steps. Each step may be performed in individual hardware and software that performs computation and controls the hardware but, in a broader category, it is performed by an on-line service provider, that is, a server. Exceptionally, the step of collecting route information is performed by a route tracing agent installed in the client.

In step 210, the server receives access information including hop information about a route from a client to a server using a route tracing agent. As described previously, the route tracing agent is installed in the client to collect the IP addresses of hops involved in the access route from the client to the server and provide the collected IP addresses to the server.

The collected hop information preferably includes the IP addresses of a predetermined number of hops selected in order of proximity to the client from among the IP addresses of a plurality of hops involved in the route from the client to the server. The predetermined number may vary depending on an environment in which embodiments of the present invention are implemented. The following description will be given assuming that the predetermined number is 5.

Even though a user outside a service region (an area from which access is allowed by the on-line service provider) falsifies the user's IP address into an IP address available within the service region, it may be determined based on the received IP addresses of hops whether a modulated packet of the user has been originated from the service region, because 'first 5 hops in a traced route' provides first 5 IP addresses in the route in which the packet is delivered to the server.

In step 220, the server extracts region information from the IP addresses of the hops included in the access information received in step 210. The region information may include a country code or city location information. The region information may be extracted using a database such as GeoIP. For a given host address or a given IP address, GeoIP may return country information, city information, or Internet Service Provider (ISP) information corresponding to the address. For this purpose, GeoIP stores host/IP addresses mapped to country/city/ISP information.

In summary, the step of extracting region information by the server is performed by transmitting a query with the IP addresses of the hops included in the received access information to the database mapping IP addresses to region information and receiving region information matching to the query as a response. For convenience, the received region information preferably includes at least one of a country code or a city code.

In step 230, the server determines whether the region information extracted in step 220 indicates a predetermined access-allowed region. While the access-allowed region is predetermined according to a policy by the on-line service provider, a security monitoring and control system may automatically change a region to an access-allowed/access-prohibited region. If the extracted region information indicates an access-allowed region in step 230, the server allows access of the client continuously and provides a service to the client in step 260. On the other hand, if the extracted region information indicates an access-prohibited region, the server goes to step 240.

In step 240, the server determines whether the access of the client is bypass access according to the determination made in step 230. In general, if the extracted region information indicates an access-prohibited region in step 230, the server may regard the access of the client as bypass access. However, this operation may be controlled flexibly according to a service environment.

For example, if the IP addresses of the first 2 hops out of the collected IP addresses of first 5 hops belong to an access-allowed region and the IP address of the middle 1 hop belongs to an access-prohibited region, the server may allow the access of the client because this means that even though the client is located in the access-allowed region, the client accesses the server via a router located in the access-prohibited region due to a network situation. Accordingly, it is preferred to determine whether access is bypass access by assigning a highest weight to the hop nearest to the client, when the collected IP addresses of the hops are considered.

That is, a higher weight is assigned to the IP address of a hop nearer to the client from among the IP addresses of a plurality of hops so that it may be determined whether the access of the client is bypass access, taking into account the weights assigned to the IP addresses of the hops.

If it is determined that the access of the client is bypass access, a measure should be taken on the part of the on-line service provider. Accordingly, if the server determines the access of the client to be bypass access, the server blocks the bypass access in step 250. That is, if the server determines that the client accesses the server from a region outside the service region based on the extracted country code and city location information, the server blocks the corresponding session. Thus, the server and the service can be protected.

The method for determining whether access of one user is bypass access and blocking such a bypass access attempt has been described above. A technical means for detecting a malicious user group attempting bypass access in a similar situation and blocking the malicious user group will be proposed hereinbelow.

Figure 3:
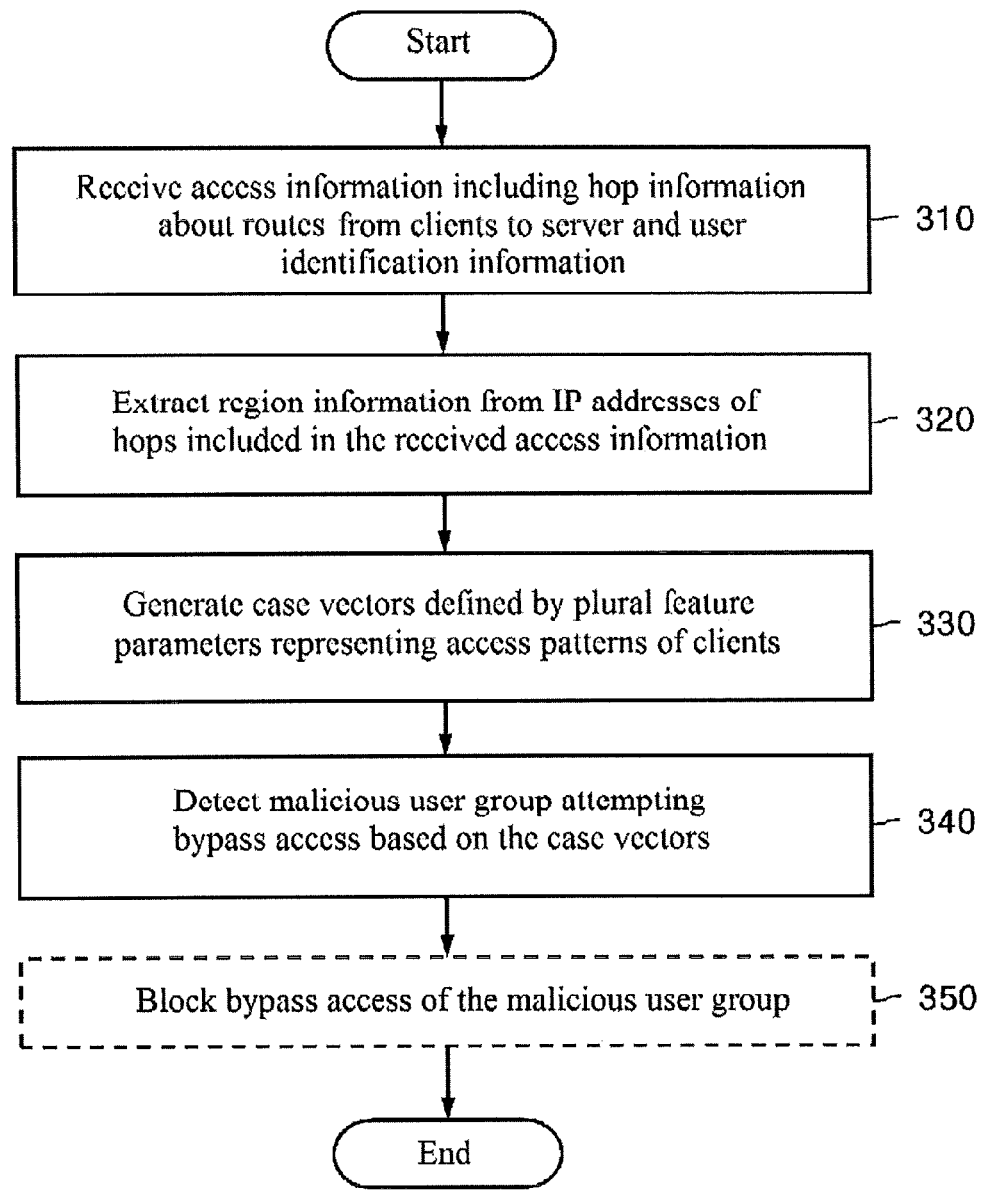
FIG. 3 is a flowchart illustrating a method for detecting a malicious user group attempting bypass access from clients to a server according to a further embodiment of the present invention.

FIG. 3 is a flowchart illustrating a method for detecting a malicious user group attempting bypass access from clients to a server according to another embodiment of the present invention. This method includes the following steps. All steps except for the step of collecting information by a route tracing agent installed in a client are performed in the server.

In step 310, the server receives access information including hop information about routes from clients to the server and user identification information from route tracing agents. The route tracing agents are installed in the clients to collect the IP addresses of hops in the access routes from the clients to the server and the user identification information and to provide the IP addresses and the user identification information to the server. Unlike the route tracing agent described in FIG. 2, each of the route tracing agents may collect at least two types of information as listed in Table 1.

TABLE 1

| Collected information | Description |
| --- | --- |
| First 5 hops of traced route | IP addresses of 5 hops |
| MAC address | MAC address at which client program is installed. |

As can be seen from Table 1, the MAC address of a user terminal having a client program is added to the IP addresses of first 5 hops involved in a traced route. The reason for collecting the MAC address of the user terminal is that different users may access using the same IP address. For example, even though a plurality of accesses are made using the same hop IP addresses on a route, the plurality of accesses may be from different users. Therefore, 'user identification information' is required to identify the users. In the embodiments of the present invention, a MAC address or user account information may be used as the user identification information. However, it will be obvious to those skilled in the art that the user identification information is not limited to a MAC address or user account information.

As in FIG. 2, the hop information about a client includes the IP addresses of a predetermined number of hops selected in order of proximity to the client from among the IP addresses of a plurality of hops included in a route from the client to the server.

In step 320, the server extracts region information from the hop IP addresses included in the access information received in step 310. Step 320 is identical to step 220 of FIG. 2 and a detailed description thereof is thus omitted.

In step 330, the server generates case vectors each being defined by a plurality of feature parameters representing an access pattern of a client based on the received access information. Herein, the term "case vector" means an index or log value generated to include attribute values (hereinafter, referred to as feature parameters) of individual accesses. The case vector is used as an index to identify an access region and a similar user in the access region. The feature parameters may include at least one of user identification information, the IP addresses of hops, and extracted region information. In the embodiment of the present invention, the case vector is generated by combining the user identification information, the IP addresses of the hops, and the region information extracted in step 320. However, those skilled in the art will understand that these feature parameters can be freely selected and may vary depending on implementation.

For example, a case vector may be represented as a combination of an access time of a user, an access account of the user, the IP addresses of first 5 hops involved in a route, region information (country codes or city names) corresponding to the respective IP addresses of the first 5 hops, and a MAC address of a user terminal. That is, the case vector may be expressed by Equation 1.

$$\text{Case Vector} = (\text{MAC}, \text{ACCOUNT}, \text{IP1}, \text{IP2}, \text{IP3}, \text{IP4}, \text{IP5}, \text{CC1}, \text{CC2}, \text{CC3}, \text{CC4}, \text{CC5})) \quad \text{Equation 1}$$

In Equation 1, MAC represents the MAC address of a user terminal, ACCOUNT represents the name of a user account, IP1 to IP5 represent the IP addresses of first 5 hops, and CC1 to CC5 represent country codes corresponding to the IP addresses of the hops. It should be understood that feature parameters other than those shown in Equation 1 may also be included in the case vector.

In step 340, the server detects a malicious user group attempting bypass access based on the case vectors generated in step 330.

More specifically, distances between the plurality of case vectors generated in step 330 are calculated taking into account similarities between the feature parameters of the case vectors. Herein, the distances between the case vectors may be calculated using Euclidean distances obtained by assigning values inversely proportional to the similarities between the feature parameters of the case vectors. That is, as feature parameters are more similar, a smaller value is assigned and the resulting Euclidean distance is made smaller. The distance between case vectors is calculated using a Euclidean distance in the embodiment of the present invention, but it may be calculated in other methods according to an implementation environment.

Values assigned to feature parameters described in Equation 1 may be calculated according to a method given in Table 2.

TABLE 2

| Feature Parameters | Computation Method |
| --- | --- |
| MAC address | If two MAC addresses are the same, 0 is assigned and otherwise, 1 is assigned (in this case, even though the MAC addresses are similar, it cannot be said that physical distances are similar. |
| Account name | The similarity between account names is determined and a result value is assigned according to the determination. For example, the similarity between character sequences may be determined using Edit Distance. |

TABLE 2-continued

| Feature Parameters | Computation Method |
|---|---|
| IP address | For IPv4, an IP address is divided into four classes. If the total classes are identical between IP addresses, 0 may be assigned. If Classes A, B, and C are identical between the IP addresses, 0.25 may be assigned. If Classes A and B are identical between the IP addresses, 0.5 may be assigned. If Class A is identical between the IP addresses, 0.75 may be assigned. If all classes are different between the IP addresses, 1 may be assigned. For IPv6, the values may be extended appropriately. |
| Country Code | If two country codes are the same, 0 is assigned and if the country codes are different, 1 is assigned. |
| City Name | If two city names are the same, 0 is assigned and if the city names are different, 1 is assigned. |

The computation method given in Table 2 may be used as a computation rule for comparing case vectors and may be changed appropriately according to a given implementation environment.

Once values are assigned regarding feature parameters in the computation method, the distance between case vectors may be calculated using a Euclidean distance. For ease of explanation, it is assumed that two case vectors A and B configured according to Equation 1 are given as follows.

Case vector A=(00-26-66-08-F0-25, cenda001, 192.168.0.99, 192.168.0.1, 163.152.61.1, 163.152.16.33, 163.152.2.81, @P, @P, KR, KR, KR)

Case vector B=(00-53-22-08-FF-33, sendi02, 192.168.0.98, 192.168.0.1, 219.137.167.157, 219.137.167.1, 112.175.197.14, @P, @P, CN, CN, KR)

Regarding case vectors A and B, values assigned according to the computation method given in Table 2 are shown in Table 3.

TABLE 3

| Feature Parameters | Computation Results |
|---|---|
| MAC address | 00-26-66-08-F0-25≠00-53-22-08-FF-33→1 |
| Account name | cenda001→senda001→sendi001→sendi021→sendi024/8 = 0.5 |
| IP1 | 192.168.0.99: 192.168.0.98→0.25 |
| IP2 | 192.168.0.1: 192.168.0.1→0 |
| IP3 | 163.152.61.1: 219.137.167.157→1 |
| IP4 | 163.152.16.33: 219.137.167.1→1 |
| IP5 | 163.152.2.81: 112.175.197.14→1 |
| Country Code | @P-@P-KR-KR-KR: @P-@P-CN-CN-KR→0.6 |

The distance between the two case vectors (case vector A and case vector B) may be calculated based on the assigned values shown in Table 3 according to Equation 2.

$$DIST(A,B) = \sqrt{1^2 + 0.5^2 + 0.25^2 + 0^2 + 1^2 + 1^2 + 1^2 + 0.6^2} \approx 2.16 \quad \text{Equation 2}$$

In the step of calculating the distance between the case vectors, similarities are preferably compared using only external IP addresses while ignoring internal IP addresses in a local area network, taking into account the order of proximity to clients. This is because it is preferred to compare only external IP addresses usable to identify routes on a network in order to prevent congestion of the routes due to an internal VP located in a specific region and exclude the unspecific feature of internal IP addresses.

For accurate detection, it is preferred to compare IP addresses, country codes, or city names in such a manner that IP1 to IP5 of case vector A are compared with IP1 to IP5 of case vector B in a numerical order, IP1 to IP4 of case vector A are compared with IP2 to IP5 of case vector B, or IP1 to IP3 of case vector A are compared with IP3 to IP5 of case vector B. Further, it is preferred to recalculate the distance by assigning a weight for each number of compared IP addresses, detect a point having a minimum distance, and use the distance as a representative value. For example, if 5 IPs are compared between the two case vectors and the case vectors are identical in all of the 5 IPs, a weight 0 may be assigned. If 4 IPs are compared between the two case vectors and the case vectors are identical in all of the 4 IPs, a weight 0.2 may be assigned.

Subsequently, clusters are generated out of accesses of the clients by calculating similarities using the distances between the case vectors through Multi-Dimensional Scaling (MDS). The MDS is a method for, when a non-similarity or a similarity is given for n objects, placing n points having distances matching to the non-similarity in a space of a certain dimension. In the embodiment of the present invention, the MDS is used to determine a similarity between a plurality of collected case vectors or determine cluster formation out of the case vectors. For example, if there are 100 case vectors, 100-dimensional data is calculated by the MDS. For convenience of computation and user recognition, the 100-dimensional data is converted into two-dimensional data. For cluster analysis, a cluster analysis algorithm such as k-means may be used. The MDS and k-means can be used appropriately by those skilled in the art and a detailed description thereof is thus omitted herein.

Finally, a group having a similarity equal to or larger than a first threshold and a distance equal to or smaller than a second threshold is determined to be a malicious user group among the generated clusters. Clustering may be determined by arranging the generated clusters based on an appropriate parameter (i.e. a parameter as an index that can be considered as a cluster) and comparing the clusters with a predetermined threshold. For example, on the assumption that a cluster is set when the similarity between generated cluster data is equal to or smaller than a specific threshold, the cluster data may be arranged according to similarities and it may be determined that a group having a similarity equal to or smaller than the threshold has formed a cluster.

Referring back to FIG. 3, if a malicious user group has been detected in the above operation, the server may block the bypass access of the malicious user group in step 350. Herein, the server may manage the malicious user group by continuously updating the results of cluster analysis based on collected IP addresses, MAC addresses, and extracted country codes and city information.

Figure 4:
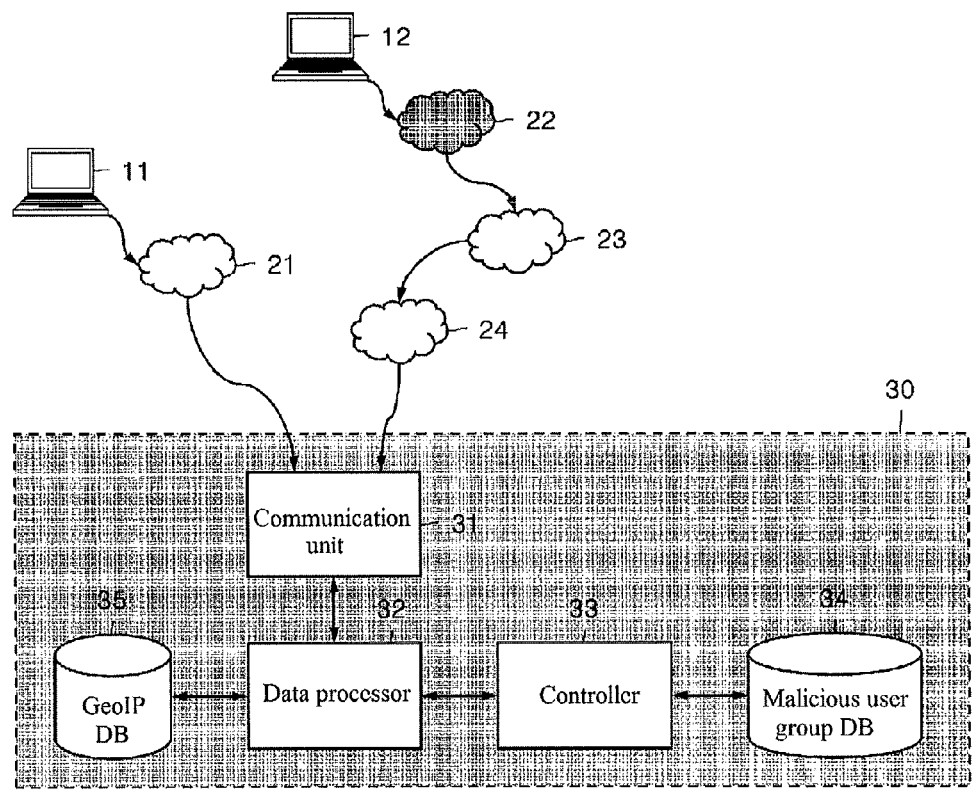
FIG. 4 is a block diagram illustrating an apparatus for detecting bypass access of clients and a malicious user group according to embodiments of the present invention.

FIG. 4 is a block diagram illustrating an apparatus for detecting bypass access of a client and a malicious user group according to embodiments of the present invention. The method for detecting bypass access has been described in detail with reference to FIGS. 2 and 3, and thus each component of the server 30 for performing the method will be described comprehensively in brief.

A communication unit 31 is hardware directly responsible for communication between the server 30 and the clients 11 and 12. The communication unit 31 receives an access from a user and transmits a response to the user.

A data processor 32 receives access information (including hop addresses involved in routes from the clients 11 and 12 to the server 30 and user identification information) from route tracing agents installed in the clients 11 and 12 through the communication unit 31 and extracts region information corresponding to the IP addresses of the hops included in the access information. Herein, a GeoIP database 35 may be used.

A controller 33 may determine whether the region information extracted from the data processor 32 indicates predetermined access-allowed regions. If a corresponding access is detected as bypass access, the controller 33 may block the bypass access. In addition, the controller 33 may generate each case vector by combining user identification information, the IP addresses of hops, and extracted region information and may detect a malicious user group attempting bypass access based on the case vectors. The detected malicious user group may be managed continuously through a database 34 and the controller 33 can be used to block bypass access from the malicious user group. Accordingly, the controller 33 may be implemented as one or more processors that process a series of operations. A memory that provides a temporary storage space needed for the operations and software added to the memory may be used.

Figure 5:
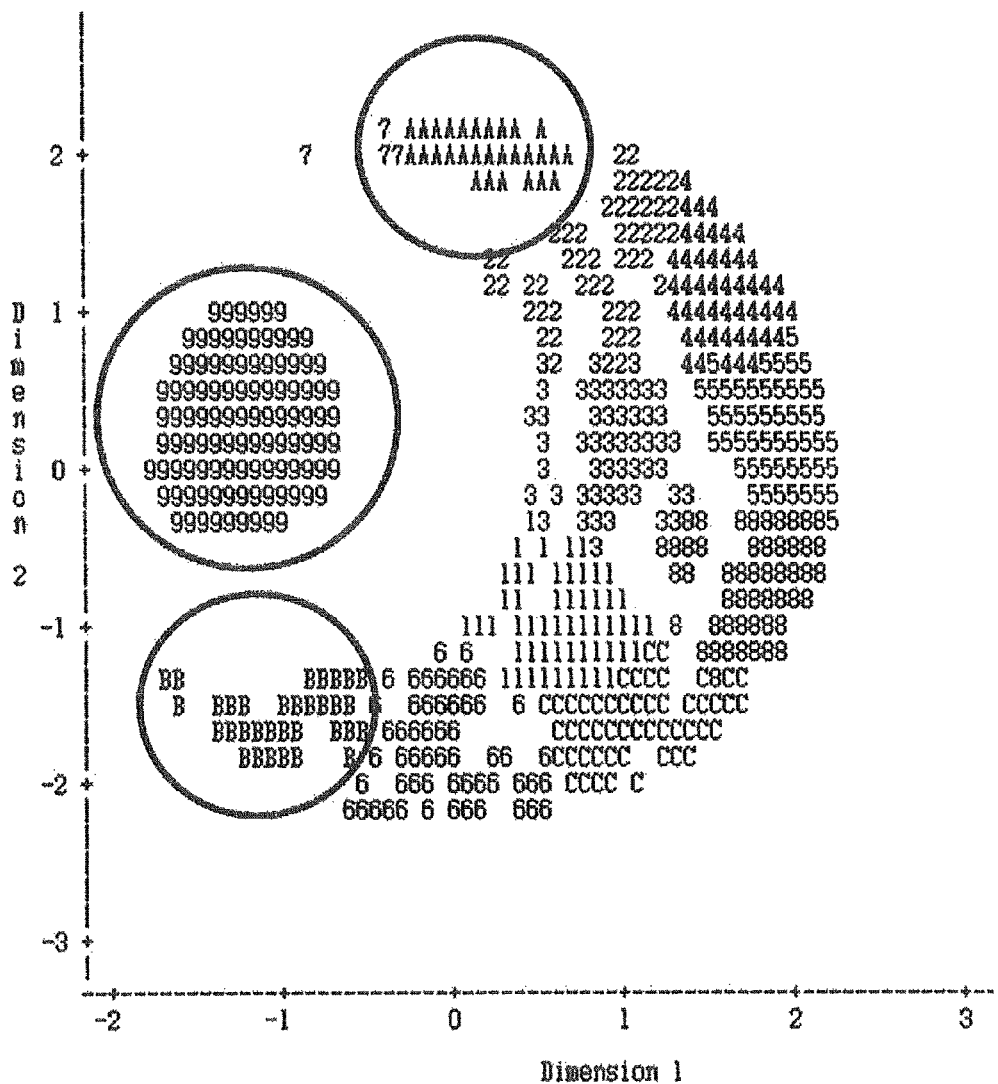
FIG. 5 graphically shows the results of detecting clusters formed out of accesses of clients by Multi-Dimensional Scaling (MDS) according to embodiments of the present invention.

FIG. 5 graphically shows the results of detecting clusters formed out of accesses of clients by MDS according to embodiments of the present invention. As already explained in FIG. 3, FIG. 5 shows two-dimensional data converted from multi-dimensional data. As clearly shown in FIG. 5, 'group 9', 'group A', and 'group B' determined as malicious user groups form clusters.

FIG. 6 lists exemplary log values of case vectors of clusters detected by a method for detecting a bypass access according to embodiments of the present invention. Part of the data of 'group 9' used in the simulation of FIG. 5 is shown. As can be seen from FIG. 6, packets transmitted from initial user terminals, that is, routes of access attempts are identical in terms of first 5 hop IP addresses and countries but are different in terms of user account names and MAC addresses, demonstrating that 'group 9' continuously attempts to access the server through a plurality of users or a malicious program in a specific space. An example of the malicious user group may be a so-called 'workplace' that causes problems in an on-line game service. The 'workplace' refers to a specific place in which a plurality of users continuously access a server and participate in a game service in order to gain monetary profits.

FIG. 7 lists exemplary malicious user groups detected from among clusters generated by a bypass access detection method according to embodiments of the present invention. In FIG. 7, it is noted that a group 700 of cluster 9, cluster A, and cluster B have very high route similarities and very small distances between individual case vectors within the group. Accordingly, the group 700 may be determined to be a malicious user group. Obviously, this determination may be made taking into account access regions of the user group.

Figure 8:
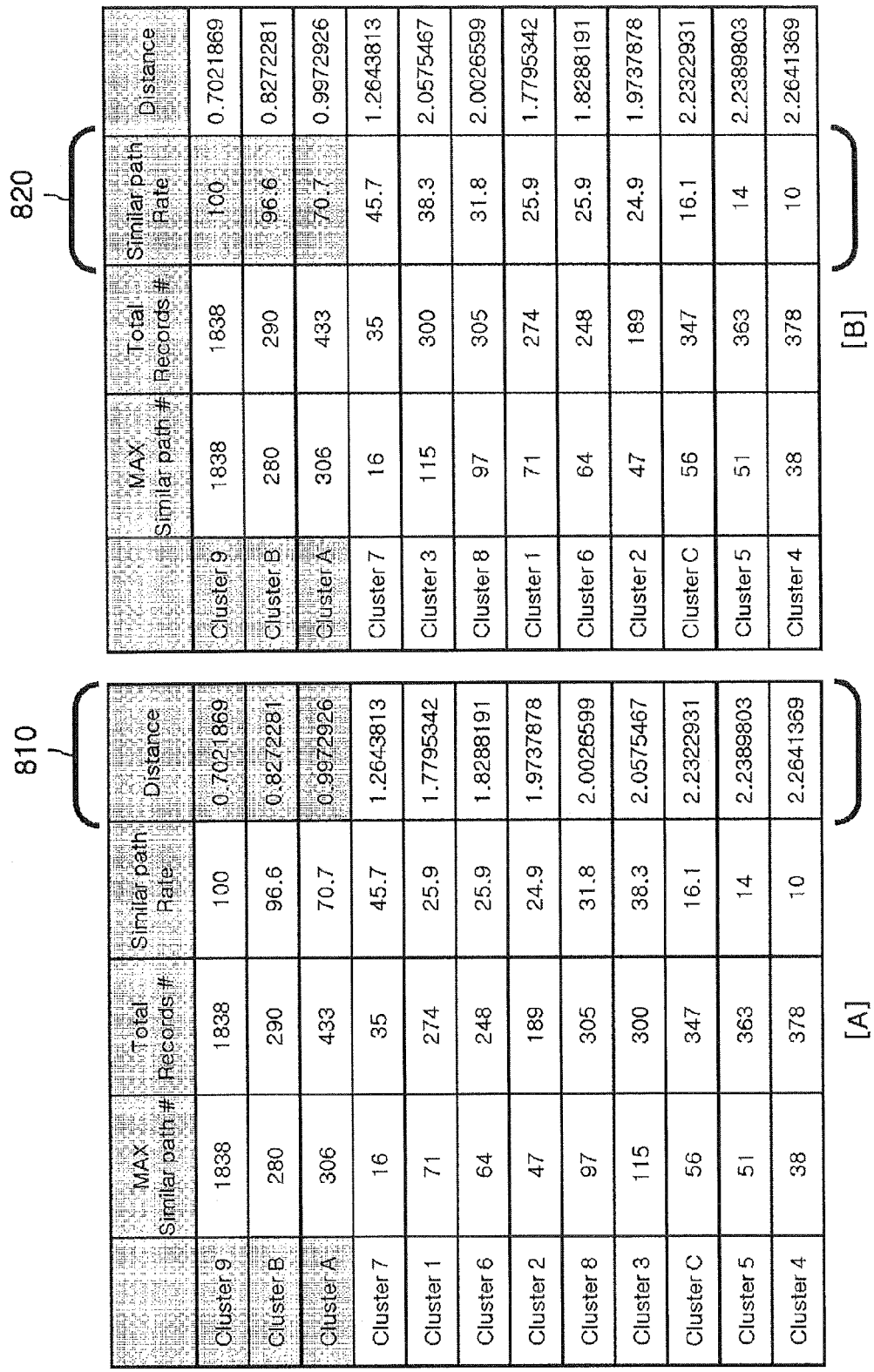
FIG. 8 explains a method for detecting a malicious user group from the clusters shown in FIG. 7.

FIG. 8 explains a method for detecting a malicious user group from clusters shown in FIG. 7. The same raw data is arranged according to specific attributes. In FIG. 8, [A] lists the clusters according to distances 810 between individual case vectors within a corresponding group and [B] lists the clusters according to similar path rates 820 of the corresponding group.

If a threshold is set to 1 for a distance between individual case vectors in a corresponding group in [A] of FIG. 8, three clusters having distances equal to or smaller than the threshold may be determined as a malicious user group. If a threshold is set to 70 for a similar path rate of a corresponding group in [B] of FIG. 8, three clusters having similar path rates equal to or larger than the threshold may be determined as a malicious user group. In the example of FIG. 8, the same first three clusters are determined as a malicious user group according to the two criteria. The results are in good agreement with the results obtained in FIG. 7.

According to the embodiments of the present invention, a server receives access information including hop information about a route from a client to a server through a route tracing agent installed in the client and analyzes the access information. Thus, even though unauthorized users attempt to access the server through a circumventing means such as a proxy server or a virtual private network, the server can identify the actual routes of the users, determine whether the users attempt bypass accesses, and block the bypass accesses.

In addition, according to the embodiments of the present invention, a malicious user group is detected by cluster analysis of case vectors. Therefore, in the case where an on-line service is limited to a specific country or region, a malicious user group attempting bypass access from the outside of the specific country or region can be effectively detected and blocked. Particularly, when users attempting bypass accesses through various overseas routes commit illegal acts on a domestic service, it is difficult to subject the users to legal punishment. In this context, the use of the embodiments of the present invention may be greatly helpful in preventing and investigating illegal acts of unauthorized users.

The embodiments of the present invention intended to achieve the first object have been described above. Now, a detailed description will be given of preferred embodiments of the present invention intended to achieve the second object with reference to the accompanying drawings in such a manner that those skilled in the art can readily implement the present invention. The present invention may, however, be embodied in different forms and is not limited to the embodiments set forth herein.

An on-line game environment will first be described with reference to FIG. 9.

Figure 9:
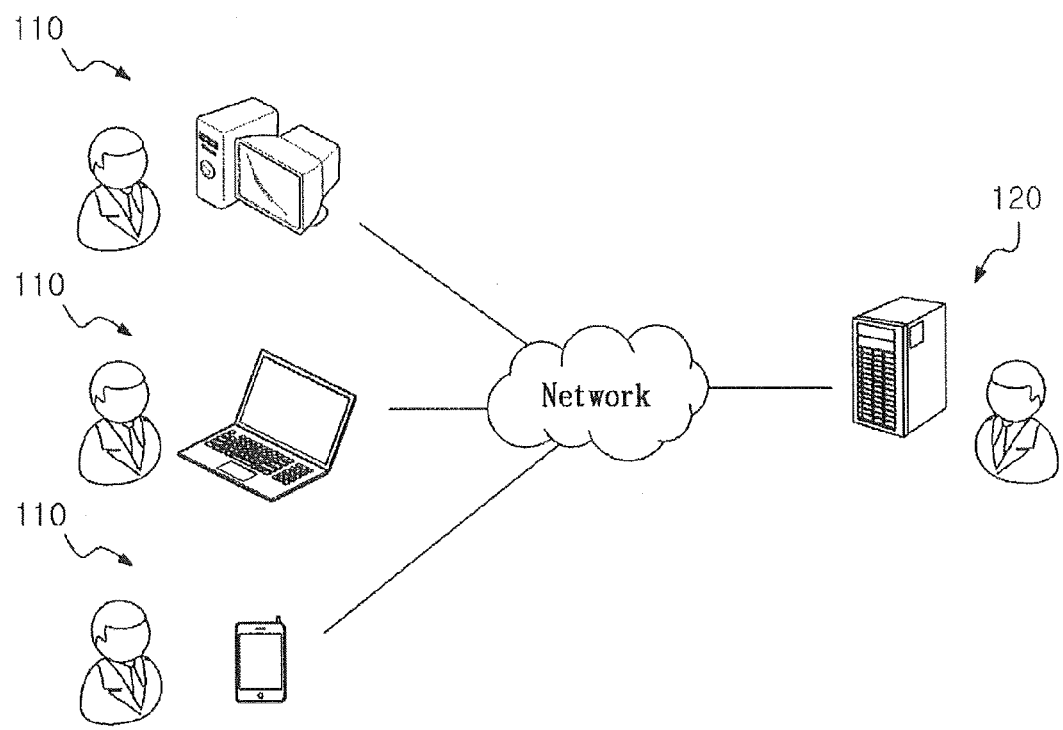
FIG. 9 schematically illustrates an on-line game environment according to another embodiment of the present invention.

FIG. 9 schematically illustrates an on-line game environment according to another embodiment of the present invention.

As illustrated in FIG. 9, a plurality of user terminals 100 such as a PC, a laptop computer and a mobile terminal access an intended game server 120 through a network and play a game in the on-line game environment. During a game play of the user terminal 110, every time a user takes an action, various types of log information are generated and stored in the game server 120. The log information includes various types of information shown in Table 4.

TABLE 4

| Log information | Description |
| --- | --- |
| Sitting | Log information recorded when a character sits down. |
| Standing | Log information recorded when a character stands up. |
| Death | Log information recorded when a character dies. |
| Getting experience | Log information recorded when a character gets an experience point. |
| Start flying | Log information recorded when a character flies. |
| Reputation point | Log information recorded when a character wins a reputation point. |
| Dual | Log information recorded when a character fights in a match. |
| Saving character information | Log information recorded when character information is periodically saved. |

TABLE 4-continued

| Log information | Description |
| --- | --- |
| Increasing game money | Log information recorded when game money of a character increases. |
| Dungeon entrance | Log information recorded when a character enters a dungeon. |
| Creating item | Log information recorded when a character creates an item. |
| Getting item | Log information recorded when a character gets an item. |
| Harvesting item | Log information recorded when a character harvests an item. |
| Using item | Log information recorded when a character uses an item. |
| Trade | Log information recorded when a character trades an item. |
| Combining item | Log information recorded when a character combines an item. |
| Deleting item | Log information recorded when a character deletes an item. |
| Quest completion | Log information recorded when a character completes a quest. |
| Reputation ranker | Log information recorded when the reputation rank of a character is changed. |

The log information includes information such as IP address information, MAC address information, country information, and city information about the user terminal 110 connected to the game server 20, as well as the information shown in Table 4.

In the present invention, it is readily determined whether the account of a user has been stolen by analyzing log information about the user.

Figure 10:
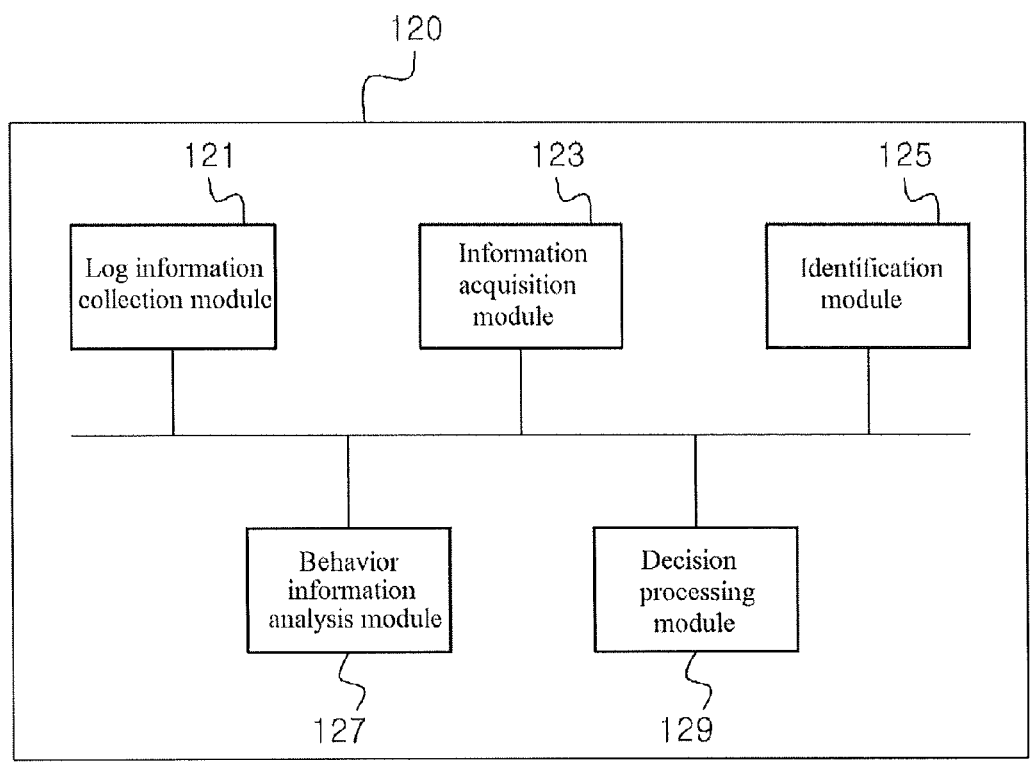
FIG. 10 is a block diagram of a system using a method for preventing account theft using log information about an on-line game according to the present invention.

With reference to FIG. 10, a system using a method for preventing account theft using log information about an on-line game will be described in more detail.

FIG. 10 is a block diagram of a system using a method for preventing account theft using log information about an on-line game according to the present invention.

As illustrated in FIG. 10, the system includes a log information collection module 121, an information acquisition module 123, an identification module 125, a behavior information analysis module 127, and a decision processing module 129.

The log information collection module 121 collects at least one piece of log information generated during a game play of the user connected to the game server through the user terminal 110.

The information acquisition module 123 acquires, from the log information collected by the log information collection module 121, at least one piece of unique user information representing unique information that identifies the user terminal, i.e. the user, and at least one piece of behavior information indicating whether the game asset of the user has been reduced. The unique user information includes at least one of IP address information, the MAC address information, country information, or city information about the user terminal connected to the game server for the game play. The behavior information represents at least one behavior of accessing the game server and reducing the asset of the user by the user terminal, such as cash payment, item trading, or game money transfer.

The identification module 125 identifies the user by comparing the unique user information acquired from the log information generated during the current game play with reference unique user information in log information generated during a usual game play of the pre-stored user. That is, the identification module 125 compares pre-stored IP address information, MAC address information, country information, and city information about the user terminal with the unique user information acquired from the log information, and determines whether the information about the user terminal is identical to or matches the unique user information The behavior information analysis module 127 determines whether the game asset of the user has been reduced by analyzing the behavior information acquired from the log information. The behavior information analysis module 127 determines whether there has been a behavior reducing the game asset of the user for a predetermined time, such as cash payment, item trading or game money transfer, based on the log information collected by the log information collection module 121. This is done to prevent an account thief of the account of the user from taking malicious actions of reducing the game asset of the user without playing a game, as soon as the account thief accesses the game server.

If the game asset of the user has been reduced for a predetermined time without identification of the user terminal, the decision processing module 129 determines that the account of the user has been stolen. Then, the decision processing module 129 disconnects the user terminal having the IP address information as the unique user information from the game server, emits a warning sound indicating account theft to the user terminal, or performs re-authentication using a public certificate or I-PIN information of the user.

Accordingly, even though a malicious user has stolen the account of the user, a behavior of reducing the game asset of the user is prevented by analyzing log information.

Hereinafter, a method for preventing account theft using log information about an on-line game according to the present invention will be described in detail with reference to FIG. 11.

Figure 11:
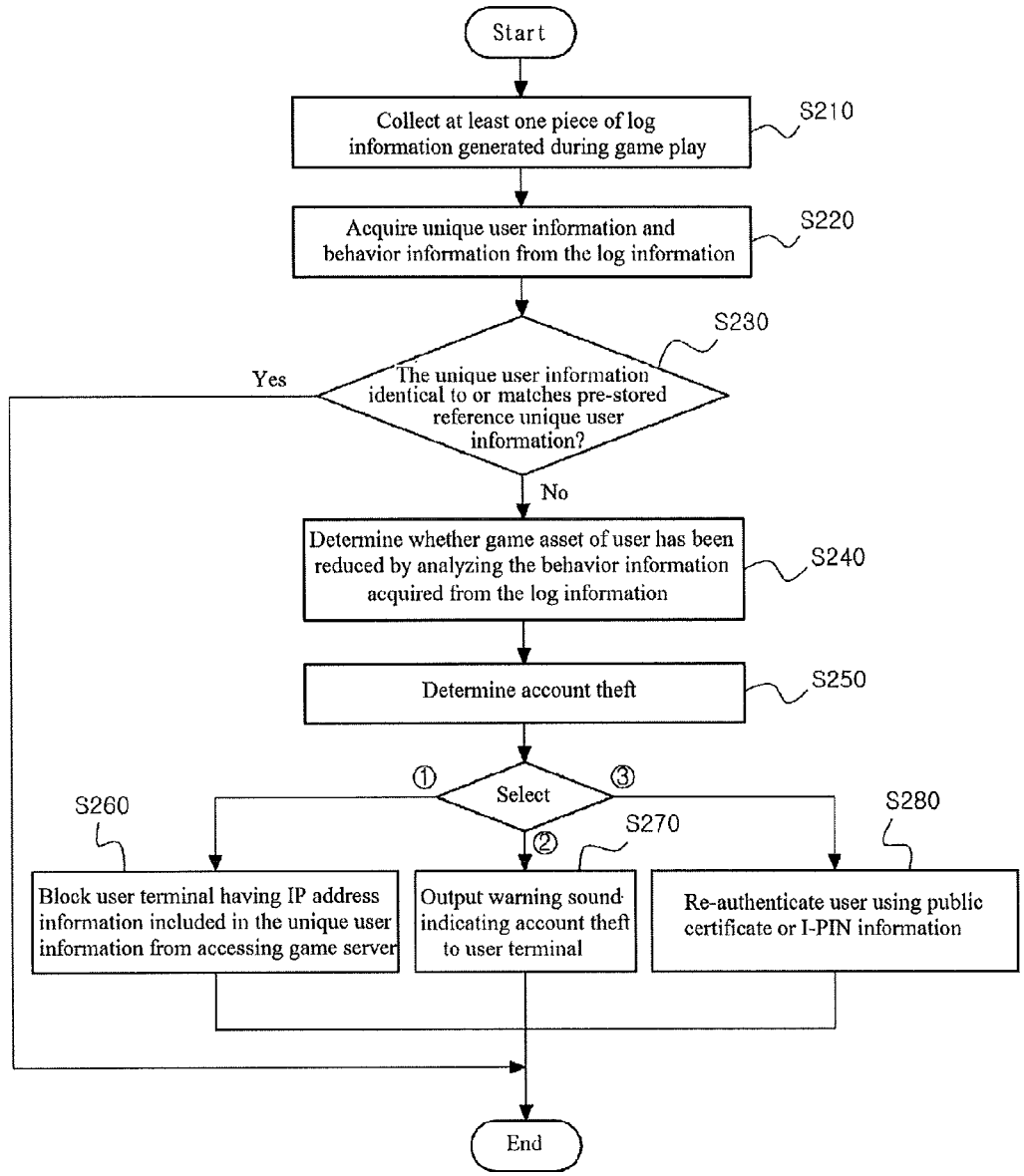
FIG. 11 is a flowchart illustrating a method for preventing account theft using log information about an on-line game according to another embodiment of the present invention.

FIG. 11 is a flowchart illustrating a method for preventing account theft using log information about an on-line game according to another embodiment of the present invention.

In the method illustrated in FIG. 11, if the plurality of user terminals 110 such as a PC, a laptop computer and a mobile terminal access the game server 120 through the network and play a game, every time a user takes an action, log information corresponding to the action is generated and stored in the game server 120.

Thus, the log information collection module 121 collects at least one piece of log information (S210).

Then, the information acquisition module 123 acquires, from the log information, unique user information that identifies the user and at least one piece of behavior information indicating whether the game asset of the user has been reduced (S220).

The unique user information about the currently connected user terminal is acquired from the already collected log information in order to determine whether the unique user information about the current user terminal is identical to or matches unique user information about a user terminal that was connected to the game server without account theft. This determination is made to determine whether the account of the user has been stolen. The unique user information includes at least one of IP address information, the MAC address information, country information, or city information about the user terminal connected to the game server for the game play.

A user terminal that accesses the game server through a stolen account behaves to reduce the game asset of an authorized user without playing game, as soon as the user terminal is connected to the game server. Therefore, for the purpose of preventing the behavior of reducing the game asset, it is preferred to acquire at least one piece of behavior information from the log information collected by the log information collection module 121.

Thus, it is determined whether the account of the user has been stolen by comparing the unique user information acquired from the log information collected by the log information collection module 121 with reference user information acquired from log information generated while the user is usually connected to the game server, and determining whether the unique user information is identical to or matches the reference user information (S230).

For example, an IP address, a MAC address, country information, and city information about a user terminal of an authorized user who regularly accesses a game server are the same every time the user accesses the game server, or two or three different IP address, MAC address, country codes, or city codes are used frequently for the user terminal. Therefore, the game server stores all of the IP addresses, MAC addresses, country information, and city information about the user terminal of the authorized user who regularly accesses the game server. The stored information may be defined as reference user information corresponding to a non-account theft state of the user and may be used to identify the user terminal, i.e. the user.

If the unique user information about the currently connected user terminal is identical to or matches the pre-stored reference unique user information, the user terminal is determined to be a user terminal of an authorized user from which an account has not been stolen.

On the contrary, if the unique user information about the currently connected user terminal is different from or does not match the pre-stored reference unique user information, it is determined whether the user terminal connected to the game server took an activity of reducing the game asset of the user (S240).

That is, if an unauthorized user steals the account of a specific authorized user and accesses the game server, the unauthorized user sells or transfers the game asset of the authorized user without playing a game on accessing the game server in order to obtain the game asset of the authorized user.

Accordingly, the behavior information analysis module 127 preferably determines whether after the user terminal accesses the game server, the user terminal has behaved to reduce the game asset for a predetermined time by analyzing the behavior information acquired by the information acquisition module 123.

If the user terminal connected to the game server is not identified and an activity of reducing the game asset for a predetermined time has occurred, the decision processing module 129 determines that the connected user terminals has stolen the account of the user (S250).

After determining that the account of the user has been stolen, the decision processing module 129 selects at least one subsequent measure and takes the selected measure in regards to the stolen user account.

For example, the decision process module 129 blocks the user terminal having the IP address information as the unique user information about the authorized user whose account has been stolen from accessing the game server (S260), thus restraining the user terminal from playing the game further.

Alternatively, the decision processing module 129 outputs a warning sound indicating account theft to the user terminal (S270) to remind a user of the user terminal of the account theft.

In addition to this, a public certificate or I-PIN information is used to re-authenticate the user of the user terminal (S280).

In the method for preventing account theft using log information about an on-line game according to the present invention, it is determined whether the account of a user has been stolen by analyzing unique user information and behavior information indicating a behavior that reduces the game asset of the user, included in log information generated while the user plays a game. This is effective in preventing monetary and metal damages that might be caused by account theft.

In the method for preventing account theft using log information about an on-line game according to the present invention, user unique information included in log information generated during a game play of a user whose account has been stolen is stored and access of a user terminal having a corresponding IP address to a game server is blocked. Consequently, theft of the account of another user can be prevented.

In the method for preventing account theft using log information about an on-line game according to the present invention, since a warning sound is emitted to a user who has stolen an account, account theft can be reminded to the user.

In the method for preventing account theft using log information about an on-line game according to the present invention, if theft of a user's account is detected by analyzing log information, the user is re-authenticated using a public certificate or I-PIN information. Thus, even though an account is stolen, reduction of game asset such as game item trading and cash payment can be prevented.

In the method for preventing account theft using log information about an on-line game according to the present invention, if account theft is detected, unique user information included in log information generated during a game play of an account thief currently logging in to a game server is stored and listed separately so that the unique user information can be managed continuously.

The embodiments of the present invention may be implemented as computer-readable codes in a computer-readable recording medium. The computer-readable recording medium may include any kind of recording device storing computer-readable data.

Examples of suitable computer-readable recording media include ROMs, RAMs, CD-ROMs, magnetic tapes, floppy disks, and optical data storage devices. Other examples include media that are implemented in the form of carrier waves (for example, transmission over the Internet). In addition, the computer-readable recording medium may be distributed over computer systems connected over the network, and computer-readable codes may be stored and executed in a distributed manner. Functional programs, codes, and code segments for implementing the present invention may be readily derived by programmers in the art.

The present invention has been described with reference to certain exemplary embodiments thereof. It will be understood by those skilled in the art that the invention can be implemented in other specific forms without departing from the essential features thereof. Therefore, the embodiments are to be considered illustrative in all aspects and are not to be considered as limiting the invention. The scope of the invention is indicated by the appended claims rather than by the foregoing description. All changes which come within the meaning and range of equivalency of the claims should be construed as falling within the scope of the invention.

INDUSTRIAL APPLICABILITY

According to the embodiments of the present invention, a server receives access information including hop information about a route from a client to the server through a route tracing agent installed in the client and analyzes the access information. Therefore, even though an unauthorized user attempts to access the server by a circumventing means such as a proxy server or a virtual private network, an actual access route of the unauthorized user can be determined accurately. Thus, bypass access of the illegal user can be determined and blocked.

In the embodiments of the present invention, it is determined whether the account of a user has been stolen by analyzing unique user information and behavior information indicating a behavior that reduces the game asset of the user, included in log information generated while the user plays a game. Therefore, monetary and metal damages that might be caused by account theft can be prevented.

The invention claimed is:

1. A method for detecting bypass access of a client to a server, the method comprising:
   receiving access information comprising hop information about a route from the client to the server through a route tracing agent by the server;
   extracting region information from Internet Protocol (IP) addresses of hops comprised in the received access information by the server;
   determining whether the extracted region information is about a predetermined access-allowed region by the server;
   determining whether access of the client is bypass access according to a result of the determination by the server, and
   wherein the determination as to whether the extracted region information is about the predetermined access-allowed region is performed using differential weights assigned to the IP addresses of hops based on proximity to the client
   wherein the hop information comprises IP addresses of a predetermined number of hops selected in order of proximity to the client from among IP addresses of a plurality of hops comprised in the route from the client to the server
   wherein a higher weight is assigned to an IP address of a hop nearer to the client among the IP addresses of the plurality of hops.

2. The method according to claim 1, wherein the extraction comprises:
   querying a database mapping IP address ranges to region information, using the IP addresses of the hops comprised in the received access information; and
   receiving region information matching to the query, and
   wherein the region information comprises at least one of a country code or a city code.

3. The method according to claim 1, further comprising, if it is determined that the access of the client is bypass access, blocking the bypass access of the client by the server.

4. The method according to claim 1, wherein the route tracing agent is installed in the client and collects IP addresses of hops involved in the route from the client to the server and transmits the collected IP addresses of the hops to the server.

5. A method for detecting bypass access of a client to a server, the method comprising:
   receiving access information comprising user identification information and hop information about a route from the client to the server through a route tracing agent by the server;
   extracting region information from IP addresses of hops comprised in the received access information by the server;
   generating a case vector defined by a plurality of feature parameters representing an access pattern of the client based on the received access information by the server; and
   detecting a malicious user group attempting bypass access based on the generated case vector by the server,
   wherein the detection of the malicious user group comprises:
   calculating distances between a plurality of case vectors generated for clients, taking into account similarities between the feature parameters of the case vectors;
   generating clusters in relation to accesses of the clients by calculating similarities from the case vectors using Multi-Dimensional Scaling (MDS); and
   determining a cluster having a similarity equal to or larger than a first threshold and a distance equal to or smaller than a second threshold to be a malicious user group.

6. The method according to claim 5, wherein the feature parameters comprise at least one of the user identification information, the IP addresses of the hops, and the extracted region information.

7. The method according to claim 5, wherein the hop information comprises IP addresses of a predetermined number of hops selected in order of proximity to the client from among IP addresses of a plurality of hops comprised in the route from the client to the server.

8. The method according to claim 5, wherein the calculation of the distances between the case vectors comprises:
   assigning values inversely proportional to the similarities between the feature parameters of the case vectors; and
   calculating Euclidean distances using the assigned values.

9. The method according to claim 5, wherein the calculation of the distances between the case vectors comprises comparing similarities using only external IP addresses while excluding internal IP addresses in a local area network, taking into account the order of proximity to the clients.

10. The method according to claim 5, further comprising, if the malicious user group is detected, blocking bypass access of the malicious user group by the server.

11. The method according to claim 5, wherein the user identification information comprised in the feature parameters comprises at least one of a name of a user account or a Medium Access Control (MAC) address of the client.

12. The method according to claim 5, wherein the route tracing agent is installed in the client and collects IP addresses of hops involved in the route from the client to the server and transmits the collected IP addresses of the hops to the server.

13. A non-transitory computer-readable recording medium recording a program to implement the method according to claim 1 in a computer.

14. A non-transitory computer-readable recording medium recording a program to implement the method according to claim 5 in a computer.

* * * * *